United States Patent [19]

Jackson et al.

[11] Patent Number: 4,463,668
[45] Date of Patent: Aug. 7, 1984

[54] BALER TWINE NEEDLE WITH BREAKOFF TIP PORTION

[75] Inventors: Robert E. Jackson, Terre Hill; Leroy A. Crawford, New Holland; Bryant F. Webb, Ephrata, all of Pa.

[73] Assignee: Sperry Corporation, New Holland, Pa.

[21] Appl. No.: 457,856

[22] Filed: Jan. 14, 1983

[51] Int. Cl.³ .............................................. B65B 13/04
[52] U.S. Cl. ..................................................... 100/24
[58] Field of Search ............. 100/17, 18, 19 R, 19 A, 100/20, 21, 22, 23, 24; 56/448; 289/16

[56] References Cited

U.S. PATENT DOCUMENTS

| 497,039 | 5/1893 | Wickey | 100/19 R |
| 2,882,813 | 4/1959 | Nelson et al. | 100/19 R |
| 3,126,815 | 3/1964 | May et al. | 100/24 |
| 3,320,875 | 5/1967 | Vidrine | 100/24 |
| 4,102,260 | 7/1978 | White | 100/24 |

Primary Examiner—Billy J. Wilhite
Attorney, Agent, or Firm—Darrell F. Marquette; Frank A. Seemar; Larry W. Miller

[57] ABSTRACT

A twine needle is provided particularly for use on large crop balers. The twine needle includes a body portion and a tip portion detachably secured to the body portion. The tip portion is designed to break off, if a predetermined force is exerted thereon, without damaging the body portion. A broken tip portion may be easily replaced without replacing the entire twine needle.

3 Claims, 3 Drawing Figures

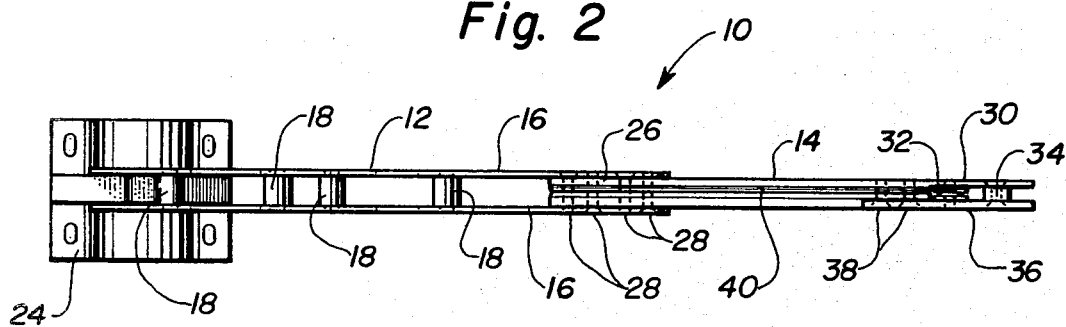
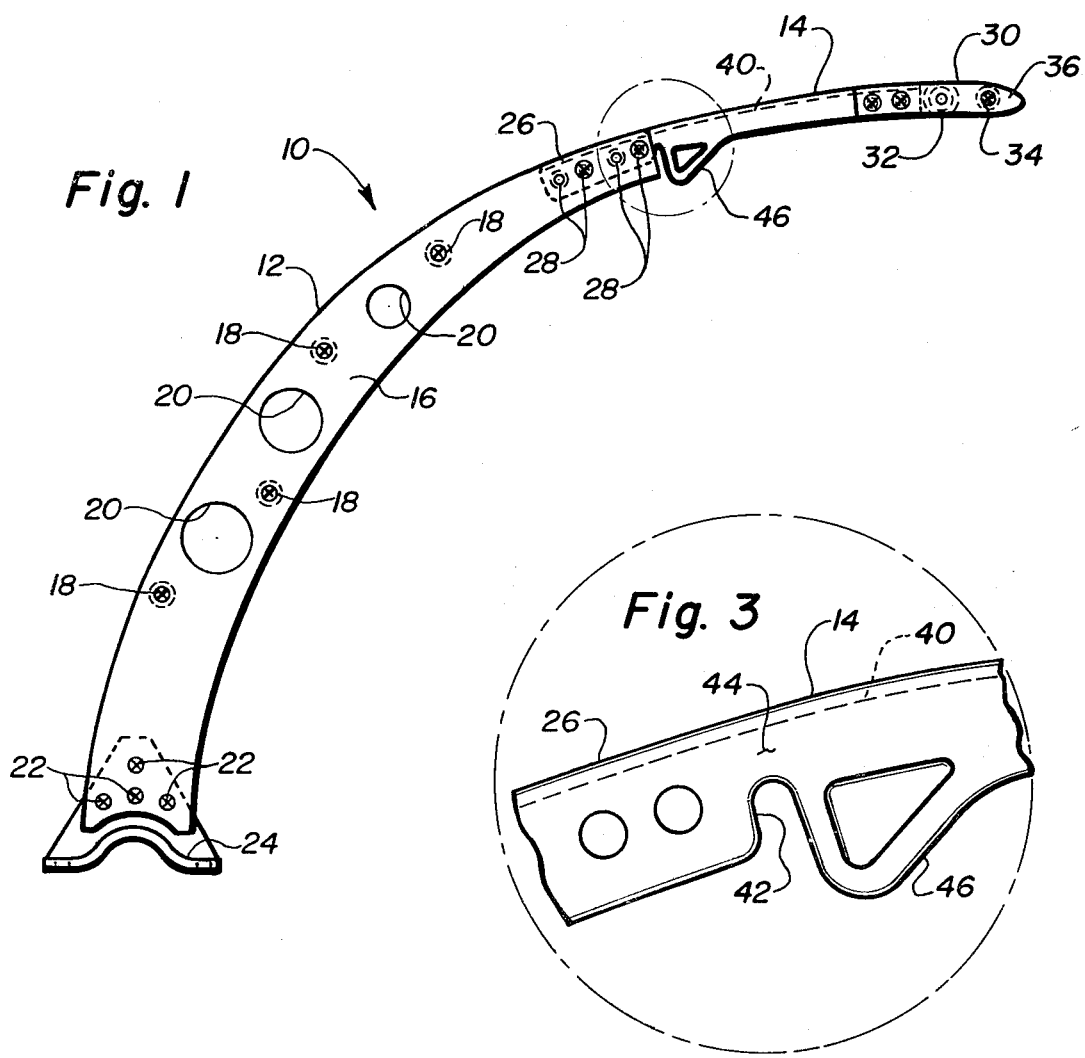

BALER TWINE NEEDLE WITH BREAK OFF TIP PORTION

BACKGROUND AND SUMMARY OF THE INVENTION

Twine needles used on standard size crop balers are generally formed of a one-piece casting of suitable metal such as iron. On very large balers, however, this type of needle is not acceptable since it would be too difficult and too costly to replace if it becomes damaged.

The present invention solves this problem by providing a baler twine needle including a body portion and a tip portion detachably secured to the body portion. The tip portion is constructed so that it will fail at a selected point in response to a predetermined force being exerted on the tip portion. If the tip portion should fail, it can be easily replaced without also replacing the body portion. The predetermined force will cause no damage to the body portion.

In the preferred embodiment of the invention, the tip portion has a section of reduced thickness at the selected point, and the tip portion breaks off at this section when the predetermined force is exerted on the tip portion.

DESCRIPTION OF THE DRAWINGS

FIG. 1 is a side view of a twine needle incorporating the present invention;

FIG. 2 is an end view of the twine needle of FIG. 1; and

FIG. 3 is an enlarged view of a portion of the twine needle of FIG. 1.

DESCRIPTION OF THE PREFERRED EMBODIMENT

A baler twine needle 10 is adapted for use in a baler to carry a strand of twine through the bale case (not shown) into a knotter assembly (not shown) in order to bind a bale with twine.

The baler twine needle 10 includes a body portion 12 and a tip portion 14. The body portion 12 is formed of parallel plates 16 connected by spacers 18. Holes 20 are provided in the plates 16 to reduce the weight of the body portion 12. The plates 16 are secured at 22 to a bracket 24 which is adapted for mounting on a shaft (not shown).

The tip portion 14 is preferably formed of cast metal such as iron or aluminum. One end 26 of the tip portion 14 is positioned between the plates 16 of the body portion 12 and is detachably fastened thereto by screws 28. The other end 30 of the tip portion 14 carries a roller 32 and a spacer 34 which are held in place by a retaining plate 36 secured by screws 38. The tip portion 14 has a groove 40 along one side thereof for receiving a strand of twine. A notch 42 is formed in the tip portion 14 in order to provide a section 44 of reduced thickness. A projection 46 is formed on the tip portion 14 adjacent the notch 42 to direct crop material away from the notch 42 and thereby minimize crop material buildup in the notch 42.

The tip portion 14 is designed to fail, i.e., break off, at the section 44 in response to a predetermined force being exerted thereon. The predetermined force could result from too much twine tension such as when the twine gets wrapped around the end 30 of the tip portion 14. The predetermined force could also result from the needle tip portion 14 striking a foreign object in the bale case. The tip portion 14 is designed to break off at the section 44 before the body portion 12 becomes deformed. This is important because a deformed needle would cause extensive damage to the knotter assembly and the plunger. The location of the section 44 is important so that when the tip portion 14 breaks off, the remaining body portion 12 will not extend above the top of the bale case and contact the knotter assembly. If the needle tip portion 14 fails, it can be easily replaced without also replacing the body portion 12.

The following claims are intended to cover all modifications and variations of the preferred embodiment of the present invention without departing from the spirit and scope of the invention.

Having thus described the invention, what is claimed is:

1. A baler twine needle comprising a body portion, a tip portion detachably secured to said body portion, said tip portion having a section of reduced thickness at a selected point which is located adjacent an end of said body portion, and said tip portion being constructed so as to break off at said selected point in response to a predetermined force being exerted on said tip portion without damaging said body portion.

2. A baler twine needle of claim 1, wherein said section of reduced thickness is formed by a notch in said tip portion.

3. The baler twine needle of claim 2, wherein said tip portion includes a projection adjacent said notch to direct crop material away from said notch and thereby minimize buildup of crop material in said notch.

* * * * *